April 25, 1967 R. D. LLOYD 3,316,029
APPARATUS FOR DISCHARGING RECEPTACLES
Filed Jan. 4, 1965 2 Sheets-Sheet 1
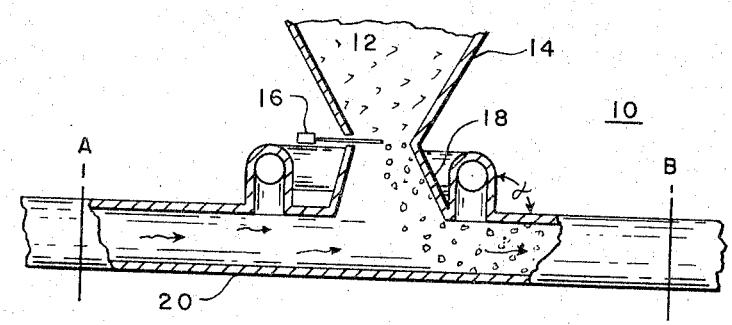
Fig. I
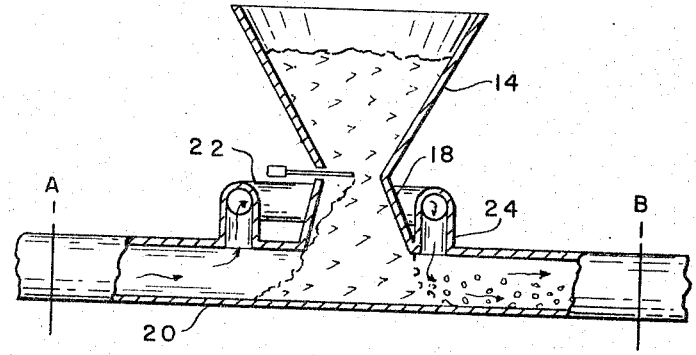
Fig. II
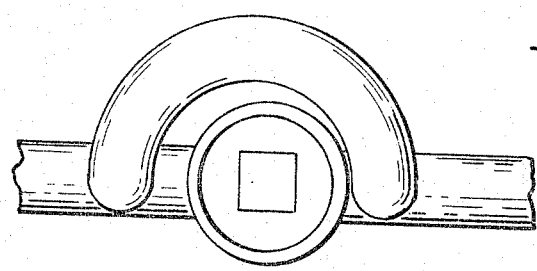
Fig. III
ROBERT D. LLOYD INVENTOR.
BY James C. Logomasini
ATTORNEY.

April 25, 1967   R. D. LLOYD   3,316,029
APPARATUS FOR DISCHARGING RECEPTACLES
Filed Jan. 4, 1965   2 Sheets-Sheet 2
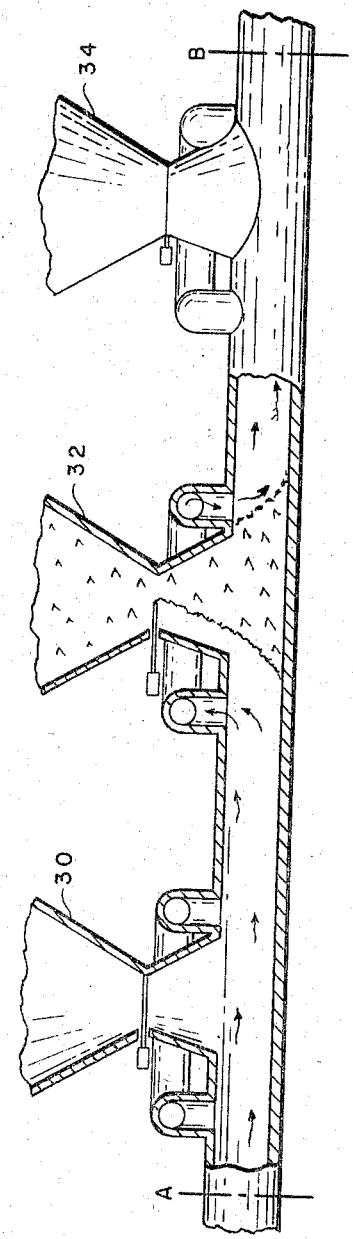
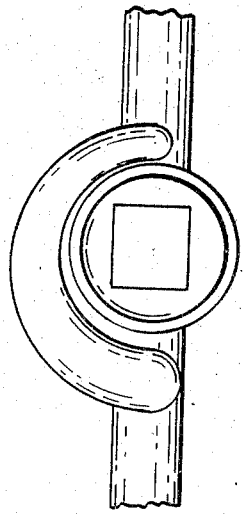
ROBERT D. LLOYD   INVENTOR.
BY James P. Fogomasini
ATTORNEY.

United States Patent Office 3,316,029
Patented Apr. 25, 1967

3,316,029
APPARATUS FOR DISCHARGING
RECEPTACLES
Robert D. Lloyd, North Wilbraham, Mass., assignor to
Monsanto Company, a corporation of Delaware
Filed Jan. 4, 1965, Ser. No. 423,216
2 Claims. (Cl. 302—52)

This invention relates to improved apparatus for unloading a material containing receptacle. More particularly, this invention relates to pneumatic unloading apparatus having an anti-clogging feature.

Manual transfer of large quantities of finely divided material from one location to another is no longer considered economically feasible. Consequently, various automatic systems have been designed such as, for example, pneumatic systems which convey the material from one point to another in an air current. Unfortunately, the effect of this type of system has been severely limited by operational problems, the most important of which is the tendency of the finely divided material to clog or plug particularly at joints or turns within the system.

Accordingly, it is a primary object of this invention to provide an improved unloading apparatus.

It is another object of this invention to provide unloading apparatus which can be used to quickly discharge materials from a receptacle into a transfer conduit with a minimum of down time due to material blockage.

It is another object of this invention to provide pneumatic unloading apparatus which is adapted to inhibit the tendency for materials to plug during discharge.

It is a further object of this invention to provide unloading apparatus which is adapted to automatically react to clear blockage which may occur when finely divided materials are being discharged from a receptacle into a transfer conduit.

These and other objects are attained in an apparatus which comprises, in combination, a receptacle, capable of containing finely divided material, having a discharge opening disposed in the bottom thereof, an unobstructed material transfer conduit communicating with said discharge opening and an unobstructed bypass conduit having one end communicating with the transfer conduit on the upstream side of said discharge opening and its other end communicating with the transfer conduit on the downstream side of said discharge opening.

The following drawings are provided for the purpose of illustrating various embodiments of the present invention.

FIGURE I is a side view, partly in section and with parts broken, illustrating an embodiment of the present invention for pneumatically unloading a receptacle under normal conditions.

FIGURE II is a side view, partly in section and with parts broken, of the same embodiment in FIGURE I after material blockage has occurred.

FIGURE III is a top view, partly in section and with parts broken, of the same embodiment shown in FIGURE I.

FIGURE IV is a side view, partly in section and with parts broken, illustrating the present invention employed to unload a plurality of hoppers.

FIGURE V is a top view, partly in section and with parts broken, illustrating an alternate embodiment of the bypass conduit.

Referring in detail to the figures of the drawings and more specifically FIGURE I, there is schematically shown a pneumatic unloading system 10 which is used to discharge finely divided material 12 from a hopper 14 which is partially shown in FIGURE I. Initially, gate 16 is closed preventing the finely divided material 12 from dropping through the discharge collar 18 into the material transfer conduit 20. In the normal sequence of operations, a flow of air is initiated between upstream point A and downstream point B of sufficient velocity to convey the finely divided material 12 at a predetermined volumetric rate. Next, discharge gate 16 is moved laterally a certain distance necessary to permit finely divided material 12 to drop from hopper 14 into the material transfer conduit 20 at or below the predetermined volumetric rate for the system. The volumetric rate is controlled primarily by the extent the discharge gate is opened. This rate should not be allowed to exceed that level which is above the capability of the air conveying system to carry the material. The capability of the air conveying system is in turn primarily dependent on the cross-section of the material transfer system, the velocity of the air and the type of material being transferred. With respect to the material, the volumetric rate is generally determined based on the bulk density and flowability of the material to be discharged as well as other factors which might affect these properties during storage, i.e., moisture, etc. However, these properties are subject to variations and there are varying conditions which will generally affect the system as a whole such as the varying quantities of the material 12 within hopper 14 which would affect its discharge rate, fluctuations in the air flow along the material transfer conduit 20, etc. Consequently, the overall system is quite delicate and subject to variations which could cause the material to plug or block at any time within the system.

FIGURE II illustrates the same system after material blockage has occurred below hopper 14 within the material transfer conduit 20. This is generally considered the most troublesome part of the system in terms of clogging. FIGURE II illustrates the reaction of the system to a blockage of this type. More specifically, the air flow between points A to B which has been interrupted by the blockage of the finely divided material 12 has been forced along an alternate path or bypass 22. Bypass 22 re-enters the material transfer conduit 20 adjacent to but on the opposite side of the blockage at opening 24. This bypass is shown more clearly by reference to FIGURE III. The spacing between the discharge collar 18 and the bypass opening 24 is sufficiently close to cause the air emanating from the bypass 22 through opening 24 to be directed against the blocked material resulting in a sweeping or gouging out of finely divided material from the blocked mass. This process continues until the blocked portion has been substantially eliminated whereupon the normal air flow illustrated in FIGURE I is again resumed.

The operation for discharging multiple hoppers in sequence is similar to the discharge of the single hopper shown in FIGURE I. FIGURE IV illustrates a typical embodiment for unloading a plurality of hoppers utilizing the present system. In FIGURE IV a blockage is shown at hopper 32 which is being discharged and the resulting air flow which takes place is indicated by arrows moving from points A to B.

FIGURE V illustrates the top view of an embodiment illustrating a specially designed bypass which diminishes in cross-section as it extends around the discharge hopper port. This particular bypass is designed for maximum flushing of the blocked mass at a minimum pressure drop.

In general, the present invention comprises discharging finely divided material from a hopper into an air conveying system which is especially designed to eliminate blockage as it occurs. This is accomplished by bypassing air around the blocked portion to a point immediately in front of the blockage such that air is directed against the upstream portion of the blocked material causing material to be carried or conveyed from the blocked mass downstream to its destination. This will continue until the mass of the blocked material has been sufficiently reduced to permit the resumption of a normal flow of air through the material transfer conduit. During normal conditions when the material transfer conduit is not obstructed, the flow through the bypass will be at a minimum.

The cross-section of the bypass and particularly the portion of the bypassed re-entering material transfer conduit may vary within wide limits but is generally less than the cross-section of the material transfer conduit. For optimum results, the cross-section of the bypass should be less than the cross-section of the material transfer conduit particularly since this increases the capability of the bypass to focus a higher velocity of air against the blocked mass beneath the hopper discharge. On the other hand, if the cross-section of the bypass is too small in relation to the cross-section of the material transfer conduit, extremely large pressure drops will be encountered seriously impairing the effectiveness of the present invention. For optimum results, the ratio of the bypass cross-section of the bypass where it enters the downstream portion of transfer conduit should range between ¼ to ¾ or more preferably ⅓ to ½ times the cross-section of the material transfer conduit. It is obvious that the optimum level within this range will vary depending for the most part on the type of material being transported. Some materials will be heavier than others or have a greater tendency to pack thereby requiring higher velocities to loosen the surface material from the clogged mass. In addition to the criticality of the cross-section of the bypass leading to the material transfer conduit, the angle at which the bypass is directed into the material transfer conduit is important as well as the distance between the bypass entry opening and the discharge collar connecting the hopper to the material transfer conduit. For optimum results, the downstream angle (this would be the angle α shown in FIGURE I) between the longitudinal axis of the material transfer conduit and the entering longitudinal axis of the bypass where it enters the downstream side of the conduit will vary between 45 to 135 and more preferably between 55 to 100 degrees.

As shown in FIGURE I, the bypass enters the conduit adjacent to the diverging collar member which connects the receptacle and the material transfer conduit. However, it is also possible to have the bypass enter the collar section on the downstream side if desired. The last hopper in FIGURE IV shows this embodiment. The important consideration is that the bypass enter close enough to the blocked material within the conduit below the receptacle to allow the air to strike portions of the blocked mass to carry the material away. On the other hand, the bypass should not enter so close to the middle of the discharge collar to interfere with the normal flow of material from the receptacle.

Although the embodiment which is illustrated employs a circular material transfer conduit and bypass, it is obvious that any cross-sectional shape may be used, for example, square, rectangular, hexagonal cross-sectional members may be used if desired. The shape of the bypass should be such to minimize pressure drop losses for optimum performance. As pointed out, the relative size of the transfer conduit and the bypass are important while the size of the hopper or receptacle which is employed is not considered critical. Likewise, the wall thickness of the transfer tube and hopper are not critical and will be determined by the type of materials being utilized and the size of the structure. These wall structures may vary from rather thin, e.g., 1/16 inch to reasonably thick, e.g., ¾ inch.

The materials of construction used in the practice of this invention are not critical and will be determined by persons skilled in the art to achieve maximum utility with minimum weight. For example, typical materials of construction may include some of the better known metals such as steel, aluminum, bronze, etc., and may even include rigid plastics such as methacrylate resins, vinyl chloride polymers and copolymers, fluorocarbon polymers, polyamides, and the like.

The materials which may be unloaded by means of described apparatus are not critical and may be any of the various materials which are generally stored or transported in bulk, e.g., polystyrene pellets, polyvinyl chloride pellets, polyethylene pellets, polypropylene pellets, various copolymers of styrene, ethylene, propylene, etc., with other monomers, etc. The invention is most useful in the conveyance of finely divided materials which may range from very small particles to very large particles and which may range from almost liquid to very hard particles.

The invention has been illustrated with certain representative embodiments and details which have been shown for the purpose of illustration. It will be apparent to those skilled in the art that various changes and embodiments may be made without departing from the spirit and scope of the invention.

What is claimed is:

1. An apparatus adapted to automatically react to eliminate material blockage which may occur when materials are being discharged from a receptacle into a transfer conduit which comprises, in combination, a receptacle capable of containing finely divided material, having a discharge opening disposed in the bottom thereof, an unobstructed material transfer conduit communicating with said discharge opening and an unobstructed bypass conduit having a cross-section ¼ to ¾ times the cross-section of said material transfer conduit and having one end communicating with the transfer conduit on the upstream side of said discharge opening and its other end communicating with the transfer conduit on the downstream side of said discharge opening at an angle traversing the surface of repose of material entering said material transfer conduit from said discharge opening.

2. The apparatus according to claim 1 wherein the bypass conduit diminishes in cross-section as it extends from the upstream to the downstream portion of the conduit.

References Cited by the Examiner

UNITED STATES PATENTS

| 585,804 | 7/1897 | Weber | 302—23 |
| 3,188,146 | 6/1965 | Cordes | 302—53 |
| 3,206,255 | 9/1965 | Grey | 302—52 |

FOREIGN PATENTS

| 950,449 | 10/1956 | Germany. |
| 701,271 | 12/1953 | Great Britain. |

ANDRES H. NIELSEN, *Primary Examiner.*

EVON C. BLUNK, *Examiner.*

A. L. LEVINE, *Assistant Examiner.*